(12) United States Patent
Nguyen et al.

(10) Patent No.: US 8,982,587 B2
(45) Date of Patent: Mar. 17, 2015

(54) COMPENSATING RIPPLE ON PULSE WITH MODULATOR OUTPUTS

(75) Inventors: Vietson M. Nguyen, Rockford, IL (US); Adam Michael White, Belvidere, IL (US); Harry Huazhen Chai, Caledonia, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 375 days.

(21) Appl. No.: 13/453,527

(22) Filed: Apr. 23, 2012

(65) Prior Publication Data

US 2013/0279216 A1 Oct. 24, 2013

(51) Int. Cl.
*H02M 1/12* (2006.01)
*H02M 1/14* (2006.01)

(52) U.S. Cl.
CPC .................................... *H02M 1/14* (2013.01)
USPC ............................................ 363/39; 363/41

(58) Field of Classification Search
USPC ........... 363/16, 34, 35, 37, 39, 41, 44, 49, 89, 363/93; 318/139, 373, 400.06, 802, 811, 318/806, 805
See application file for complete search history.

(56) References Cited

U.S. PATENT DOCUMENTS

| | | | | |
|---|---|---|---|---|
| 6,154,379 A * | 11/2000 | Okita | ............................. | 363/40 |
| 6,850,426 B2 * | 2/2005 | Kojori et al. | .................. | 363/123 |
| 7,126,409 B2 * | 10/2006 | Nielsen | ......................... | 327/391 |
| 7,193,872 B2 * | 3/2007 | Siri | ................................ | 363/95 |
| 7,250,740 B2 * | 7/2007 | Katsuki et al. | ............ | 318/400.13 |

* cited by examiner

*Primary Examiner* — Rajnikant Patel
(74) *Attorney, Agent, or Firm* — Cantor Colburn LLP

(57) ABSTRACT

A ripple compensation apparatus comprises a ripple detection unit to detect a ripple on a dual DC bus, a waveform generation unit to generate a modulated waveform based on a base waveform and the detected ripple, and a multi-phase control signal generation unit to receive the modulated waveform and to generate at least one pulse width modulated control signal based on the modulated waveform.

9 Claims, 8 Drawing Sheets

US 8,982,587 B2

COMPENSATING RIPPLE ON PULSE WITH MODULATOR OUTPUTS

BACKGROUND OF THE INVENTION

The present disclosure relates to compensating ripple in a power system, and in particular to systems, methods, and apparatuses to calculate ripple in a DC bus generated from an AC power source and to use the calculated ripple to compensate the ripple of a multi-phase AC output powered by the DC bus.

Multi-phase power inverters/converters modulate a DC bus to provide a multi-phase voltage at an output. However, when the DC bus includes harmonic ripple from a power source used to generate the DC bus, the harmonic ripple may be passed to the AC output side of the power inverters/converters powered by the DC bus.

BRIEF DESCRIPTION OF THE INVENTION

Embodiments of the present disclosure include a ripple compensation apparatus comprising a ripple detection unit to detect the ripple on a dual direct current (DC) bus, a waveform generation unit to generate a modulated waveform based on a base waveform and the detected ripple, and a multi-phase control signal generation unit to receive the modulated waveform and to generate at least one pulse width modulated (PWM) control signal based on the modulated waveform.

Embodiments of the present disclosure further include system comprising a multi-phase power inverter configured to receive a DC voltage input and modulated control signals and to output a multi-phase AC voltage based on the DC voltage input and the modulated control signals, and a ripple-compensation circuit configured to detect ripple in the DC voltage input, to generate a ripple-compensation waveform, and to generate the modulated control signals based on the ripple-compensation waveform.

Embodiments of the present disclosure further include a method comprising detecting ripple on a dual DC bus, generating a ripple-compensation waveform based on the detected ripple, and generating a multi-phase AC output based on a DC voltage provided by the dual DC bus and the ripple-compensation waveform.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
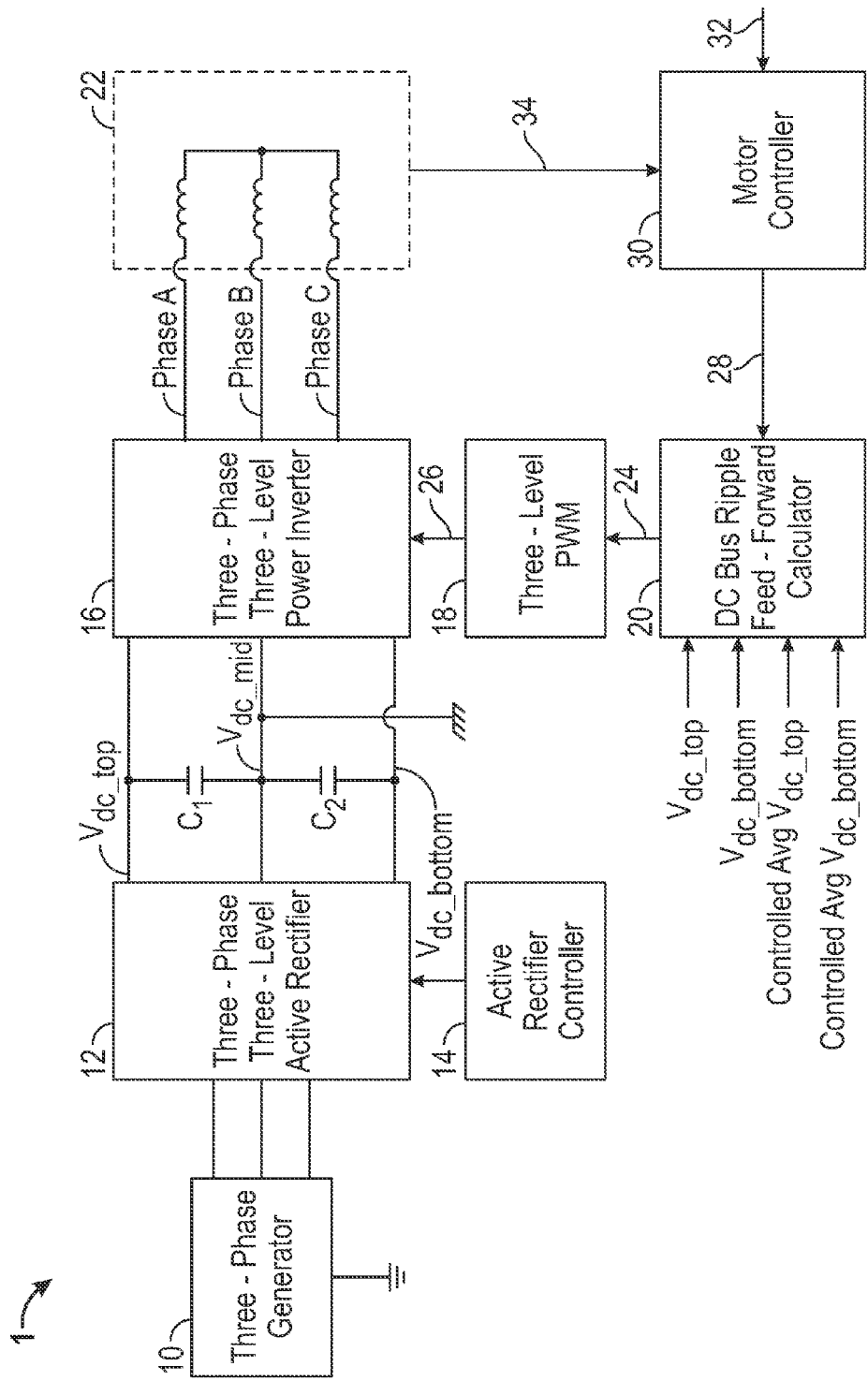
FIG. 1 illustrates a multi-phase power supply system according to one embodiment of the disclosure.

FIG. 1 illustrates a system 1 according to one embodiment of the disclosure. The system 1 includes a three-phase generator 10 configured to generate voltage outputs having three phases A, B, and C. In one embodiment illustrated in FIG. 2, the three-phase generator 10 generates power in three phases, each of which is illustrated as a separate alternating current (AC) source AC1, AC2, and AC3. It shall be understood, however, that the generator 10 can include a single rotor and stator and the particular winding arrangement is what is illustrated as separate AC current sources.

Figure 2:
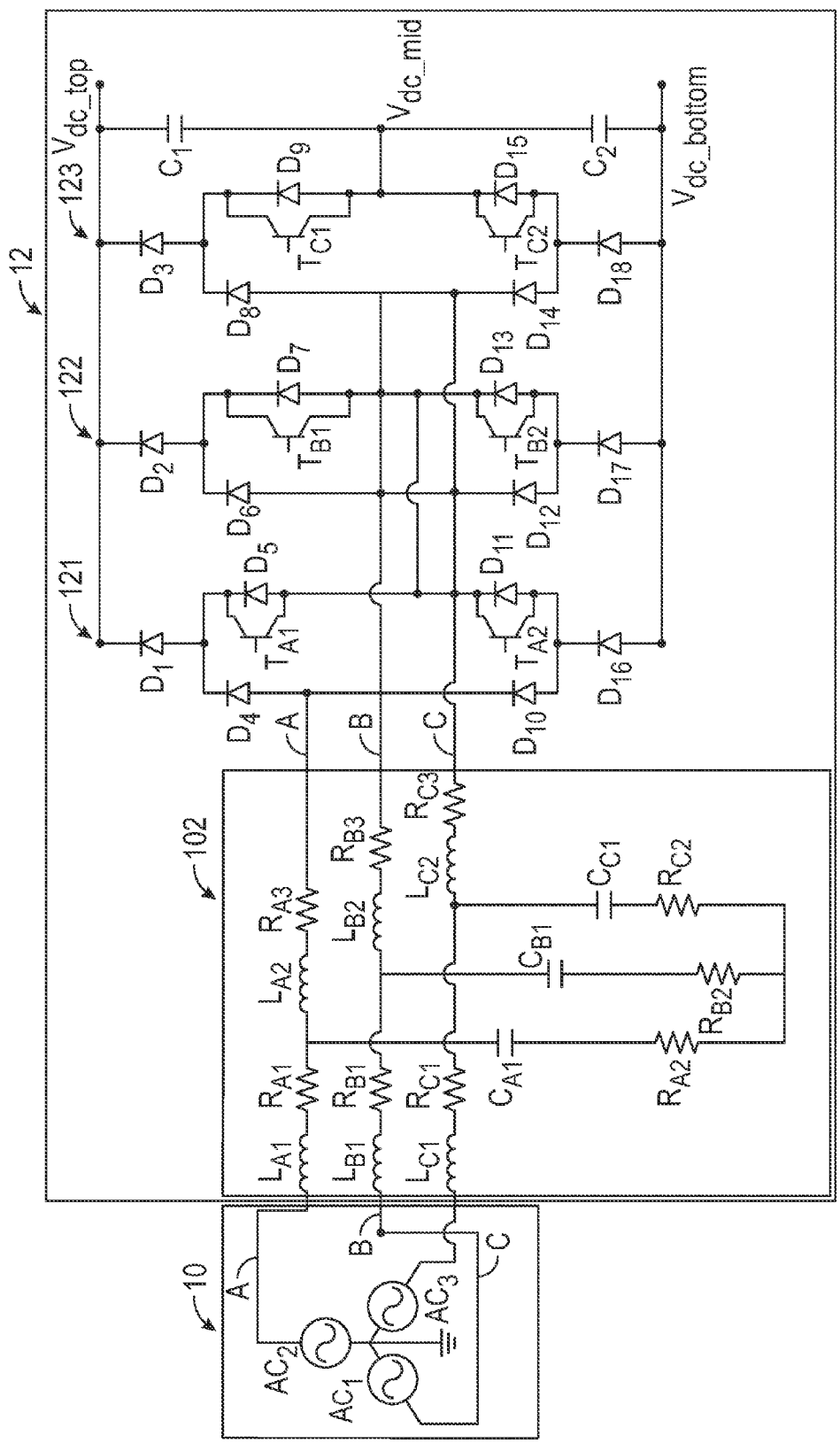
FIG. 2 illustrates a three-phase generator and an active rectifier according to an embodiment of the disclosure.

The output voltages from the three-phase generator 10 are input to a three-phase, three-level active rectifier 12. As illustrated in FIG. 2, the three-phase three-level active rectifier 12 includes a boost inductor stage 102 which also acts as an input filter section. Each phase can include its own LRC formed of respective inductors LA1, LA2, LB1, LB2, LC1 and LC2, resistors RA1-RA3, RB1-RB3, and RC1-RC3 and capacitors CA1, CB1, and CC1 to filter the multi-phase AC input currents and to provide a voltage boost operation for the three-phase three-level active rectifier 12. While FIG. 1 illustrates a three-phase generator 10, it is understood that any multi-phase generator is encompassed by embodiments of the present disclosure.

The three-phase, three-level active rectifier 12 includes a plurality of stages including phase A switching components 121, phase B switching components 122, and phase C switching components 123 corresponding to the plurality of phases A, B, and C, respectively. Each stage of switching components 121, 122 and 123 includes a plurality of transistors connected in parallel, source-to-drain. In the embodiment illustrated in FIG. 2, the stage corresponding to phase A includes transistors TA1 and TA2, the stage corresponding to phase B includes transistors TB1 and TB2, and the stage corresponding to phase C includes transistors TC1 and TC2. The three-phase, three-level active rectifier 12 may further include a plurality of diodes D1-D18 which may correspond to separate elements or to diode-like inherent properties of an integrated circuit including the transistors TA1, TA2, TB1, TB2, TC1, and TC2. The three-phase, three-level active rectifier 12 is controlled by an active rectifier controller 14 to generate a dual direct current (DC) output voltage, Vdc-top and Vdc-bottom. Each bus voltage is half of the full bus voltage from top to bottom. The Vdc-top and Vdc-bottom correspond to positive and negative rails which are symmetrical to each other from a common ground, Vdc-mid. The active rectifier controller 14 may provide control signals to turn on and off the transistors TA1, TA2, TB1, TB2, TC1, and TC2.

Outputs at the ends of the stages and a center of the stages between the respective transistors provide the dual DC bus. In particular, an output connecting a first end of each one of the stages 121, 122, and 123 provides a first DC voltage Vdc_top, an output connecting a second end of each one of the stages 121, 122, and 123 provides a second DC voltage Vdc_bottom, and an output connecting nodes between each of the pairs of transistors TA1 and TA2, TB1 and TB2, and TC1 and TC2 provides a third DC voltage Vdc_mid between the first and second DC voltages Vdc_top and Vdc_bottom. In one embodiment, Vdc_top corresponds to a positive DC voltage, Vdc_bottom corresponds to a negative DC voltage, and Vdc_mid corresponds to a DC voltage midway between Vdc_top and Vdc_bottom. In one embodiment, Vdc_mid corresponds to ground, and in one embodiment, ground has a voltage potential of 0 volts.

Figure 3:
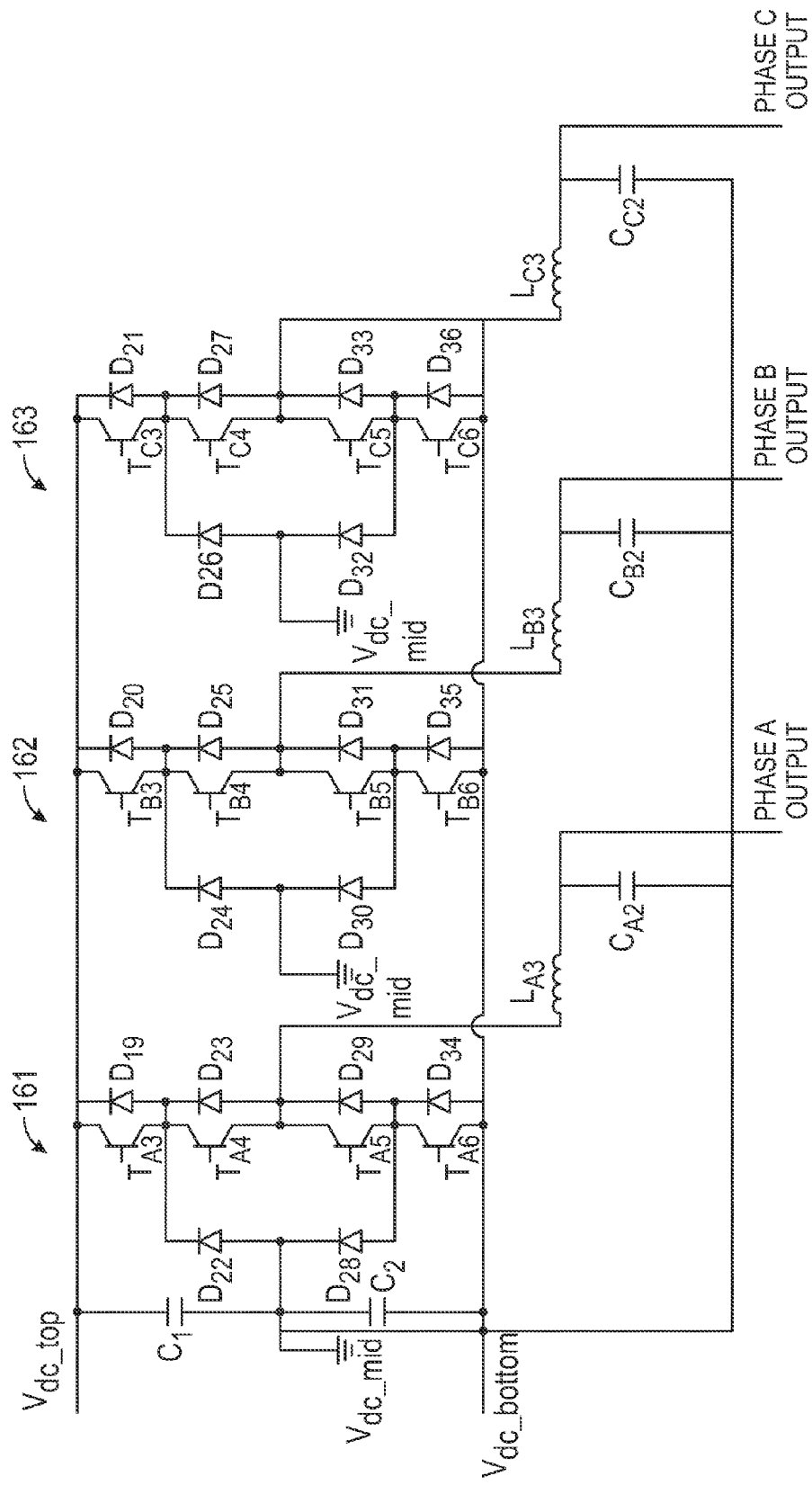
FIG. 3 illustrates a three-phase power inverter according to one embodiment.
Figure 4:
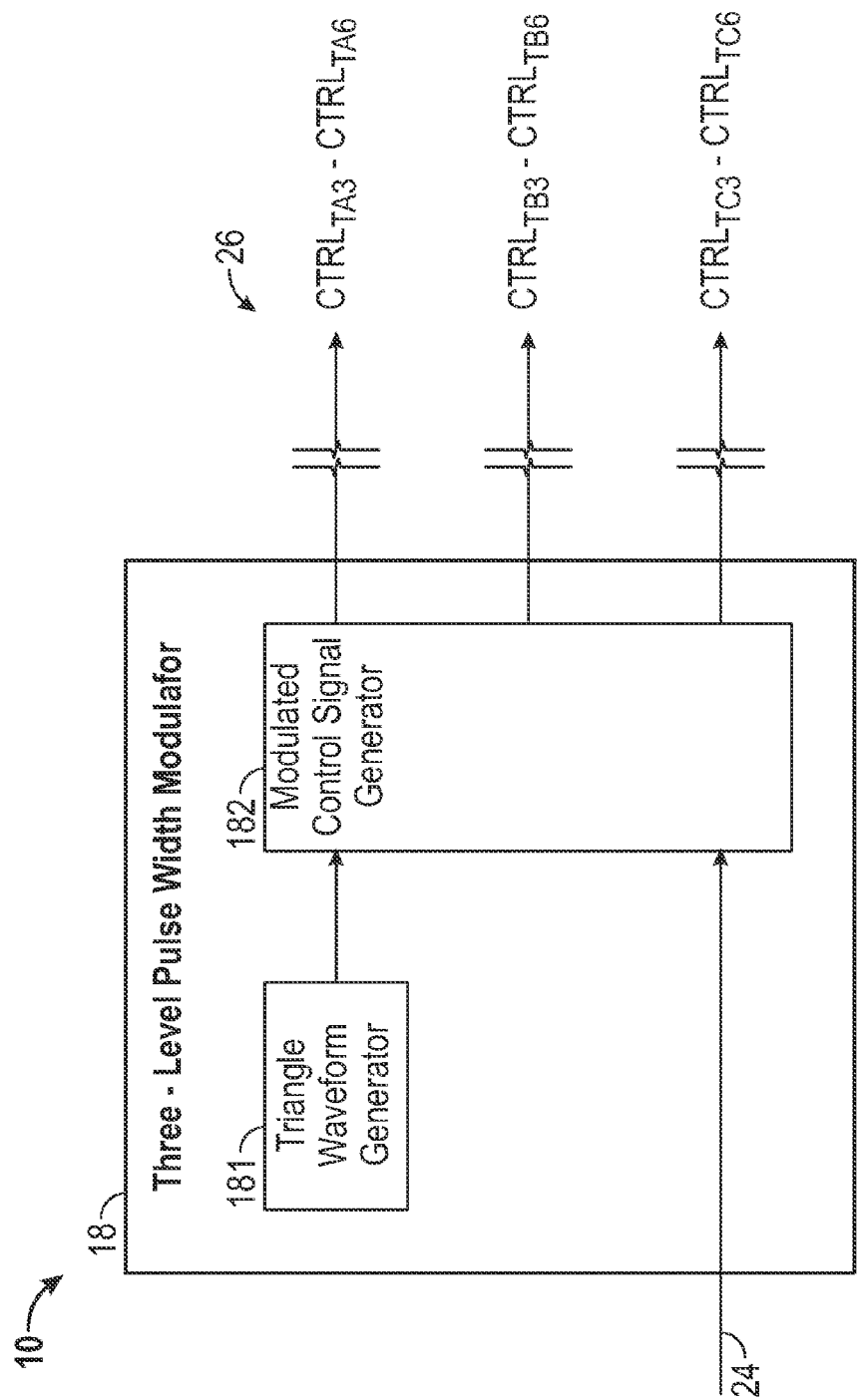
FIG. 4 illustrates a three-level pulse width modulator according to an embodiment of the disclosure.

Referring to FIGS. 1 and 2, an active rectifier controller 14 controls the gates of the transistors TA1, TA2, TB1, TB2, TC1, and TC2 to generate the dual DC output voltages Vdc_top and Vdc_bottom. Referring to FIGS. 1-3, the system 1 may further include first and second capacitors C1 and C2 connected between Vdc_top, Vdc_mid, and Vdc_bottom, respectively. Vdc_top, Vdc_mid, and Vdc_bottom are input to a three-phase, three-level power inverter 16. The three-phase, three-level power inverter 16 includes a plurality of stages 161, 162, and 163, corresponding to the respective phases A, B, and C. Each stage includes a plurality of transistors connected in series, source-to-drain. In one example embodiment illustrated in FIG. 3, the first stage 161 corresponding to phase A includes transistors TA3, TA4, TA5, and TA6; the second stage 162 corresponding to phase B includes transistors TB3, TB4, TB5, and TB6; and the third stage 163 corresponding to phase C includes transistors TC3, TC4, TC5, and TC6. The three-phase, three-level power inverter 16 may further include one or more capacitors, such as capacitors CA2, CB2, and CC2, and one or more inductors, such as inductors LA3, LB3, and LC3.

The gates of the transistors TA3-TA6, TB3-TB6, and TC3-TC6 are controlled by signals 26 from a three-level pulse width modulator (PWM) 18 to generate a three-phase output signal including phases A, B, and C to drive a three-phase AC motor 22. Although a three-phase, three-level power inverter 16 is illustrated in FIG. 1, it is understood that a power inverter having any number of stages or levels is encompassed by embodiments of the present disclosure.

Referring to FIGS. 1, 4, 5, 6A and 6B, the three-level PWM modulator 18 receives as an input a waveform 24 generated by the DC bus ripple feed-forward calculator 20. The three-level PWM 18 includes a triangle waveform generator 181 which generates triangle waveforms 29. The waveform 24 from the DC bus ripple feed-forward calculator 20 is applied to the triangle waveforms 29 by a modulated control signal generator 182 to generate the output control signals CTRLTA3-CTRLTA6, CTRLTB3-CTRLTB6, and CTRLTC3-CTRLTC6 to drive the transistors TA3-TA6, TB3-TB6, and TC3-TC6, respectively. In embodiments of the present disclosure, the triangle waveform generator 181 and modulated control signal generator 182 may comprise one or more of oscillators, filters, rectifiers, and other circuitry and software to generate the triangle waveforms and pulse width modulated control signals 26.

In embodiments of the present disclosure, the waveform 24 is a modulated sinusoidal waveform, the modulation corresponding to ripple detected by the DC bus ripple feed-forward calculator 20, and the modulation being configured to cancel the ripple from the DC bus. In particular, the DC voltage lines Vdc_top and Vdc_bottom include ripple, such as harmonic ripple coming from the generating power source as well as the rectification, which may cause the DC voltage of the dual DC bus Vdc_top and Vdc_bottom to vary in amplitude up-and-down from its assumed-to-be-a-constant value. In embodiments of the present disclosure, a modulation is applied to a base sinusoidal waveform (indicated for description purposes by reference numeral 28 in FIG. 6A) in the DC bus ripple feed-forward calculator 20 to generate a modulated sinusoidal waveform 24 having a modulation to offset the ripple of the DC bus.

Figure 6A:
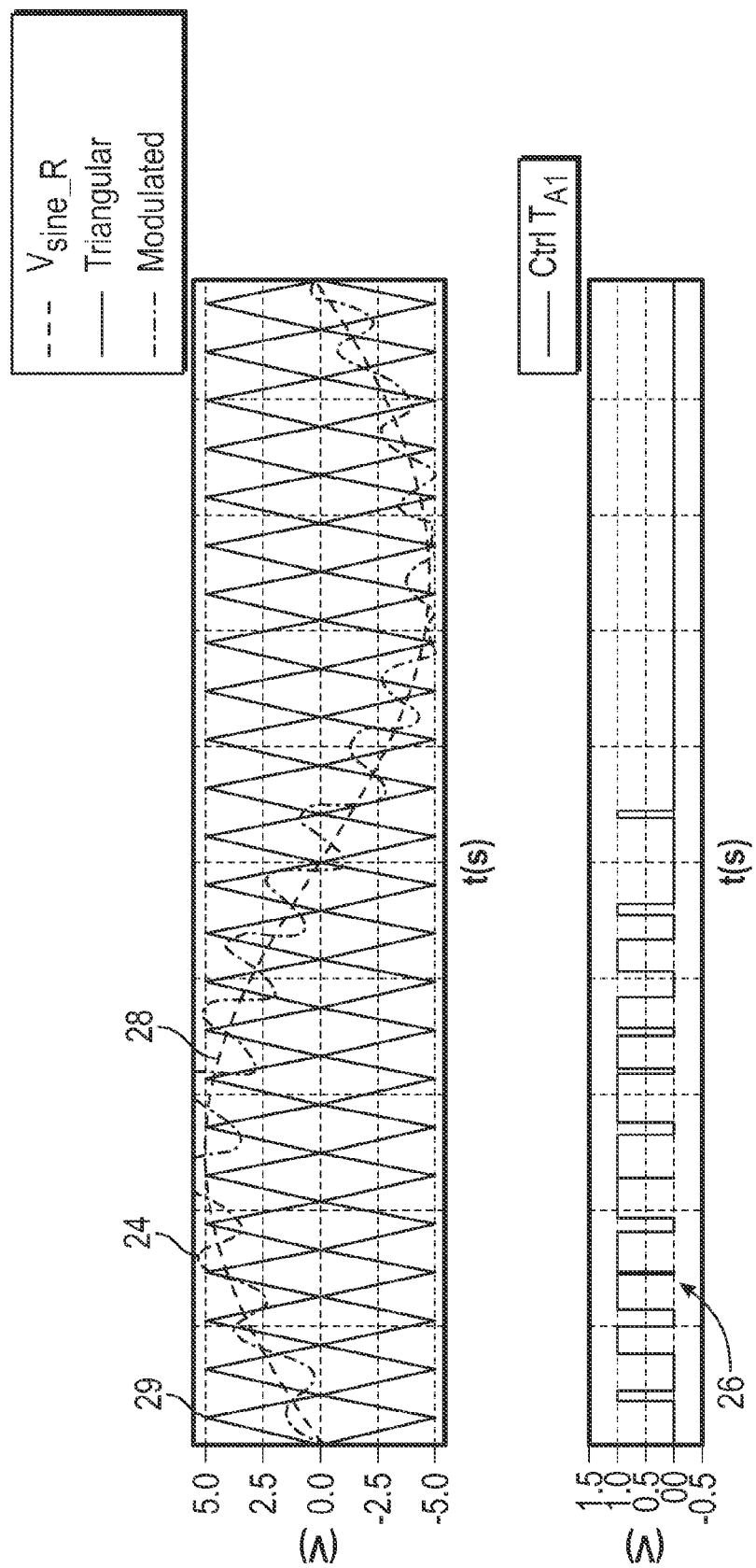
FIG. 6A illustrates a modulated sinusoidal waveform according to an embodiment of the disclosure.
Figure 6B:
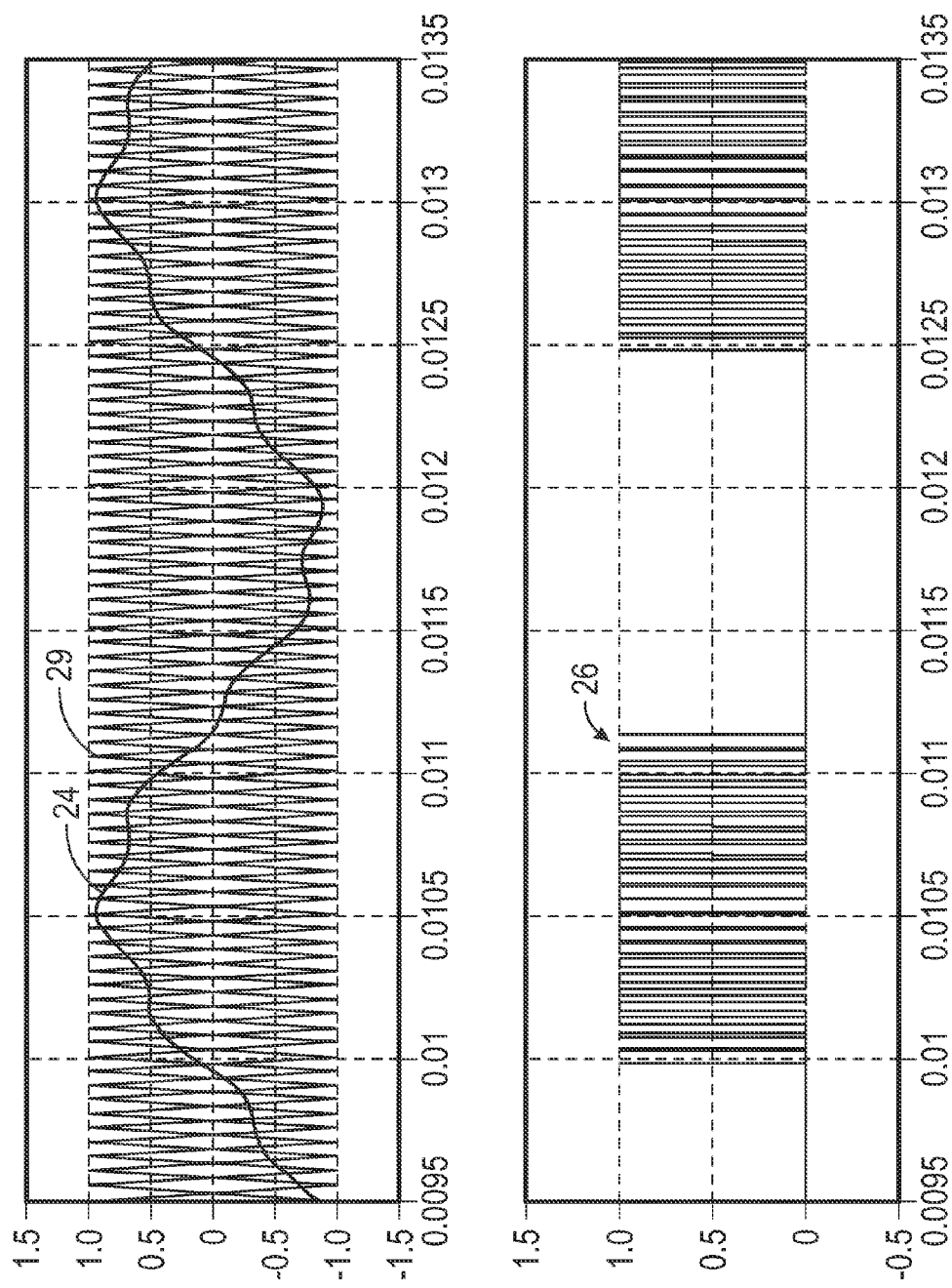
FIG. 6B illustrates a modulated sinusoidal waveform according to another embodiment of the disclosure.

FIGS. 6A and 6B illustrate embodiments of example modulated sinusoidal waveforms 24 and pulse width modulated control signals 26 according to embodiments of the present disclosure. In FIG. 6A, the base sinusoidal waveform 28 is illustrated for description purposes, and in FIG. 6B, the base sinusoidal waveform 28 is omitted. As illustrated in FIGS. 6A and 6B, the pulse width modulated control signals 26 are generated based on a value of the modulated sinusoidal waveform 24 compared to a value of the triangle waveforms 29. Referring to FIG. 1, the modulated control signals 26 are transmitted to the three-phase three-level power inverter 16 to generate a multi-phase AC output signal.

Figure 5:
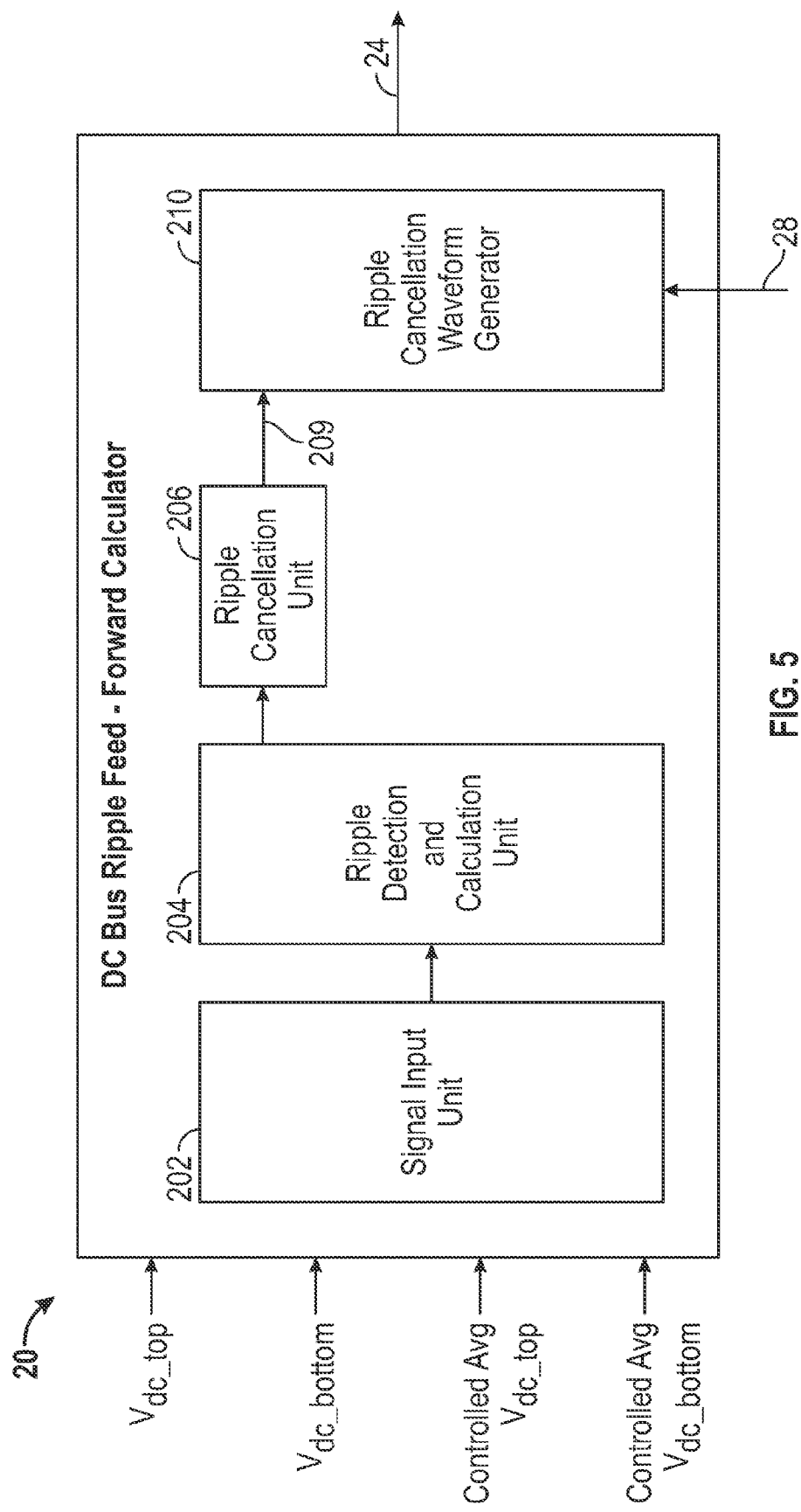
FIG. 5 illustrates a DC bus ripple feed-forward calculator according to an embodiment of the disclosure.

FIG. 5 illustrates a functional block diagram of the DC bus ripple feed-forward calculator 20 according to an embodiment of the present disclosure. The DC bus ripple feed-forward calculator 20 includes a signal input unit 202 to receive input signals corresponding to the first DC voltage Vdc_top, the second DC voltage Vdc_bottom, a controlled average of the first DC voltage Vdc_top, and a controlled average of the second DC voltage Vdc_bottom. The controlled averages of the first and second DC voltages Vdc_top and Vdc_bottom may correspond to a base voltage on which a ripple causes voltage variations. The input signals are provided to a ripple detection and calculation unit 204 which calculates a ripple of the DC voltages Vdc_top and Vdc_bottom. For example, in one embodiment, controlled averages of first and second DC voltages Vdc_top and Vdc_bottom are determined to approximate a desired DC voltage having no ripple, and the first and second DC voltages Vdc_top and Vdc_bottom are compared to the controlled averages of the first and second DC voltages Vdc_top and Vdc_bottom. The ripple detection and calculation unit 204 may comprise one or more comparison circuits to compare the controlled averages of the first and second DC voltages to the actual first and second DC voltages, and to calculate the ripple of the first and second DC voltages corresponding to the difference between the average DC voltages and the actual DC voltages.

Referring to FIGS. 1 and 5, the calculated ripple may be provided to a ripple cancellation unit 206 which generates a signal 209 to cancel the ripple. In one embodiment, the ripple cancellation signal for each DC signal Vdc_top and Vdc_bottom has an amplitude opposite the DC signals Vdc_top and Vdc_bottom relative to the controlled averages of the DC voltages Vdc_top and Vdc_bottom. The signal 209 to cancel the ripple is combined in the ripple cancellation waveform generator 210 with a base control signal 28 generated by a motor controller 30 to output the modulated waveform 24 having a modulation configured to cancel the ripple caused by the DC voltage lines Vdc_top and Vdc_bottom. Referring to FIG. 6A, the signal 209 to cancel the ripple corresponds to the difference between the base control signal 28 and the modulated waveform 24.

The motor controller 30 may receive motor control signals 32 and feedback and/or feed-forward signals from the motor 22 and may generate the base control signal 28 having a mainly sinusoidal shape, such that the waveform 24 is a modulated sinusoidal waveform 24. The ripple cancellation waveform generator 210 may include, for example, an adding circuit to modulate the amplitude of the base waveform generated by the motor controller 30 using a ripple cancellation waveform output from the ripple cancellation unit 206.

The three-level PWM modulator 18 receives as an input the modulated sinusoidal waveform 24, and outputs pulse width modulated control signals CTRLTA3-CTRLTA6, CTRLTB3-CTRLTB6, and CTRLTC3-CTRLTC6 to control the transistors of the three-phase, three-level power inverter 16. Since the pulse width modulated control signals CTRLTA3-CTRLTA6, CTRLTB3-CTRLTB6, and CTRLTC3-CTRLTC6 are generated based on the modulated sinusoidal waveform 24 that is modulated to reduce or cancel the ripple from the DC bus, the ripple from the DC voltage lines Vdc_top and Vdc_bottom is not passed through to the phase outputs A, B, and C of FIG. 3, and is not passed through to the motor 22 of FIG. 1.

Figure 7:
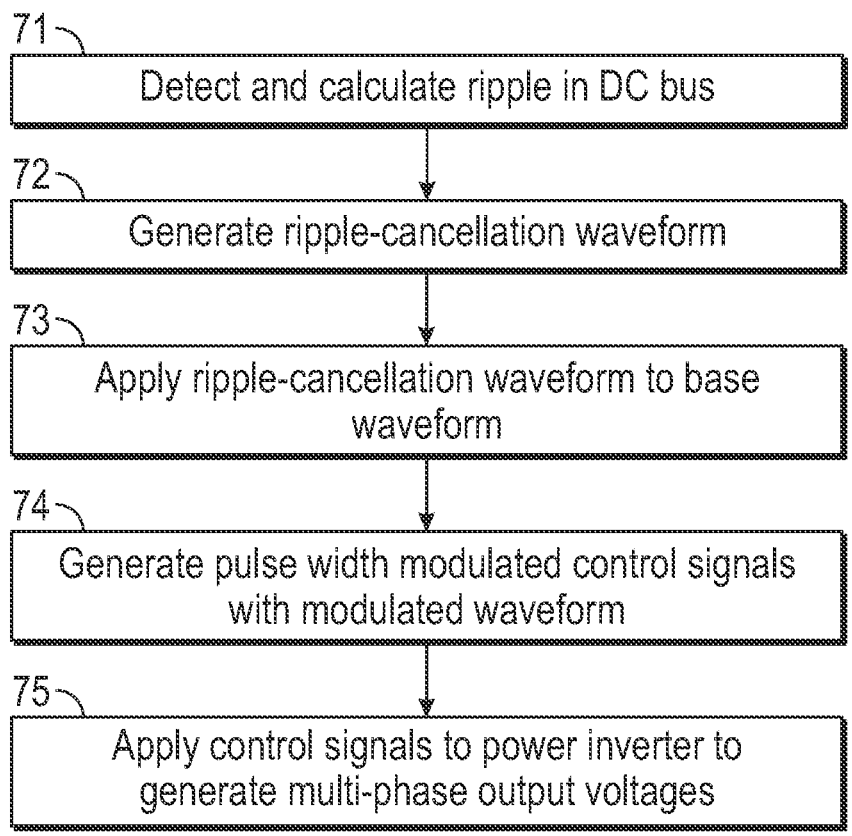
FIG. 7 is a flowchart of a method of reducing ripple in a DC bus according to an embodiment of the disclosure.

FIG. 7 is a flowchart illustrating a method of compensating ripple according to one embodiment of the present disclosure. In operation 71, a ripple in a DC bus is detected and calculated. A plurality of DC voltages of a DC bus may be input to a ripple detection and calculation assembly, and the ripple detection and calculation assembly may determine a level of ripple in the plurality of DC voltages. In one embodiment, the plurality of DC voltages is generated from a multi-phase generator and includes harmonic ripple. In one embodiment, the level of ripple in DC lines of the DC bus are calculated by comparing voltage levels of the DC lines to predetermined DC voltage levels, such as controlled average DC voltage levels of the DC lines.

In operation 72, a ripple-cancellation waveform is generated based on the determined level of ripple. In one embodiment, the ripple-cancellation waveform is a waveform configured to cancel the ripple of the plurality of DC voltages when applied to the plurality of DC voltages. In particular, a plurality of ripple-calculation waveforms may be generated, each ripple-calculation waveform corresponding to a separate one of the plurality of DC voltages. In one embodiment, the ripple-cancellation waveform is a waveform having a voltage level such that combining the ripple-cancellation waveform with a waveform of the detected ripple results in a substantially constant DC voltage.

In operation 73, the ripple-cancellation waveform is applied to a base waveform. In one embodiment, the base waveform is a sinusoidal waveform, and the ripple-cancellation waveform is applied to the sinusoidal waveform to modulate the amplitude of the sinusoidal waveform. In embodiments of the present disclosure, the base waveform is a waveform configured to operate a device, such as a motor by applying control signals to the device in a pattern determined by the base waveform.

In operation 74, pulse width modulated control signals are generated with the sinusoidal waveform modulated by the ripple-cancellation waveform. In one embodiment, the modulated sinusoidal waveform is provided to a three-level pulse width modulator 18 which generates the pulse width modulated control signals. In one embodiment, a separate modulated sinusoidal waveform is generated for each output phase of the system 1. For example, in a system 1 such as illustrated in FIG. 1 in which three output phases A, B, and C are generated to control a motor 22, three separate modulated sinusoidal waves may be generated by a DC bus ripple feed-forward calculator 20 and supplied to the three-level PWM modulator 18. The three separate modulated sinusoidal waves may then be used to generate separate sets of pulse width modulated control signals to control transistors of a three-phase, three-level power inverter 16 to generate the three output phases A, B, and C of a multi-phase AC voltage in operation 75.

In embodiments of the present disclosure, ripple is detected in a DC bus, a compensation signal is generated and applied to a base waveform, and a modulated waveform based on the combination of the compensation signal and the base waveform is provided to a pulse width modulator to generate pulse width modulation control signals. The pulse width modulation control signals may be applied to a multi-level power inverter to generate modulated multi-phase voltages having ripple reduced or eliminated. Embodiments of the present disclosure include multi-phase systems and apparatuses including multi-phase generators, rectifiers, power inverters, and pulse width modulators. Embodiments of the present disclosure further include methods and processes to reduce or eliminate ripple output from a multi-phase power inverter having as inputs a DC bus which may include ripple.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A ripple compensation apparatus, comprising:
   a ripple detection unit to detect a ripple on a dual DC bus;
   a waveform generation unit to generate a modulated waveform based on a base waveform and the detected ripple;
   a multi-phase control signal generation unit configured to receive the modulated waveform and to generate at least one pulse width modulated control signal based on the modulated waveform; and
   a multi-level power inverter configured to receive as inputs the dual DC bus and the at least one pulse modulated control signal and to output a multi-phase AC voltage based on the dual DC bus and the at least one pulse modulated control signal;
   wherein the multi-level power inverter includes a plurality of sets of transistors, each set corresponding to a separate one of a plurality of phases of the multi-phase AC voltage, and the at least one pulse modulated control signal includes a plurality of sets of pulse modulated control signals to control a respective one of the plurality of sets of transistors and wherein each one of the plurality of sets of transistors includes first and second transistors connected in series source-to-drain, and third and fourth transistors connected in series source-to-drain, the second and third transistors being connected in series source-to-drain, an output voltage line connected between the second and third transistors, a first DC voltage line of the dual DC bus connected to the first transistor, a second DC voltage line of the dual DC bus connected to the fourth transistor, and a third DC voltage line of the dual DC bus connected between the first and second transistors and between the third and fourth transistors.

2. The ripple compensation apparatus of claim 1, wherein the waveform generation unit includes a ripple cancellation waveform generator to generate a ripple cancellation waveform and a base waveform generator to generate the base waveform.

3. The ripple compensation apparatus of claim 1, wherein the waveform generation unit generates the modulated waveform by modulating an amplitude of the base waveform based on the detected ripple.

4. The ripple compensation apparatus of claim 1, wherein the multi-phase control signal generation unit includes a triangle wave generator and a modulated control signal generator configured to generate the at least one pulse width modulated control signal by applying the modulated waveform to a triangle wave generated by the triangle wave generator.

5. The ripple compensation apparatus of claim 1, wherein the at least one pulse modulated control signal includes a plurality of sets of pulse modulated control signals, each one of the plurality of sets of pulse modulated control signals corresponding to a different phase of the multi-phase AC voltage.

6. The ripple compensation apparatus of claim 5, wherein a number of phases of the multi-phase AC voltage is three.

7. A system comprising:
   a ripple-compensation circuit configured to detect ripple in a dual DC voltage input, to generate a ripple-compensation waveform, and to generate modulated control signals based on the ripple-compensation;
   a multi-level power inverter configured to receive the dual DC voltage inputs and that modulated control signals and to output a multi-phase AC voltage based on the dual DC voltage input and at least one pulse modulated control signal;
   wherein the multi-level power inverter includes a plurality of sets of transistors, each set corresponding to a separate one of a plurality of phases of the multi-phase AC voltage, and the at least one pulse modulated control signal includes a plurality of sets of pulse modulated control signals to control a respective one of the plurality of sets of transistors and wherein each one of the plurality of sets of transistors includes first and second transistors connected in series source-to-drain, and third and fourth transistors connected in series source-to-drain, the second and third transistors being connected in series source-to-drain, an output voltage line connected between the second and third transistors, a first DC voltage line of the dual DC voltage input connected to the first transistor, a second DC voltage line of the dual DC voltage input connected to the fourth transistor, and a third DC voltage line of the dual DC bus connected between the first and second transistors and between the third and fourth transistors.

8. The system of claim 7, wherein the ripple-compensation circuit comprises:
   a DC bus ripple feed-forward calculator to receive a signal corresponding to the DC voltage input and to generate the ripple-compensation waveform; and
   a pulse width modulator to receive the ripple-compensation waveform and to generate the modulated control signals.

9. The system of claim 8, wherein the DC bus ripple feed-forward calculator includes a ripple cancellation waveform generator including an amplitude modulator configured to receive a ripple-cancellation waveform and a base waveform and to modulate an amplitude of the base waveform based on the ripple-cancellation waveform.

* * * * *